United States Patent
Matin et al.

(10) Patent No.: US 7,064,463 B2
(45) Date of Patent: Jun. 20, 2006

(54) DYNAMOELECTRIC MACHINE WITH EMBEDDED HEAT EXCHANGER

(75) Inventors: Kaiser Matin, Herndon, VA (US);
Mark A. Benson, Leesburg, VA (US);
Mansour Peyghaleh, Sterling, VA (US)

(73) Assignee: Wavecrest Laboratories LLC, Dulles, VA (US)

( * ) Notice: Subject to any disclaimer, the term of this patent is extended or adjusted under 35 U.S.C. 154(b) by 0 days.

(21) Appl. No.: 10/893,878

(22) Filed: Jul. 20, 2004

(65) Prior Publication Data

US 2006/0017335 A1    Jan. 26, 2006

(51) Int. Cl.
*H02K 9/20*    (2006.01)
*H02K 9/19*    (2006.01)

(52) U.S. Cl. ............................. 310/52; 310/54; 310/61; 310/64

(58) Field of Classification Search ................... 310/52, 310/54, 57, 61, 64
See application file for complete search history.

(56) References Cited

U.S. PATENT DOCUMENTS

| | | | | |
|---|---|---|---|---|
| 1,700,840 A | * | 2/1929 | Gay | 310/52 |
| 2,330,121 A | * | 9/1943 | Heintz | 310/52 |
| 3,801,843 A | * | 4/1974 | Corman et al. | 310/52 |
| 3,914,630 A | * | 10/1975 | Lloyd et al. | 310/61 |
| 4,137,472 A | * | 1/1979 | Workman | 310/61 |
| 4,240,000 A | * | 12/1980 | Harano et al. | 310/54 |
| 4,322,646 A | * | 3/1982 | Persson | 310/64 |
| 4,406,959 A | * | 9/1983 | Harano et al. | 310/58 |
| 4,574,210 A | * | 3/1986 | Wieland | 310/59 |

FOREIGN PATENT DOCUMENTS

| | | | |
|---|---|---|---|
| EP | 152785 A1 | * | 8/1985 |
| GB | 2229323 A | * | 9/1990 |
| JP | 57110048 A | * | 7/1982 |
| JP | 57170042 A | * | 10/1982 |
| JP | 01085548 A | * | 3/1989 |

* cited by examiner

*Primary Examiner*—Burton Mullins
(74) *Attorney, Agent, or Firm*—Heller Ehrman LLP

(57) ABSTRACT

A dynamoelectric machine, having a stator and rotor, is enclosed in a sealed housing. An impeller fixed to the rotor shaft creates air circulation through the housing and machine components for contact with one or more sealed containers of a coolant medium. The sealed container provides heat transfer from the circulated air through evaporation of the coolant medium. The sealed container has one closed end located within the housing and another closed end external to the housing. Heat from the evaporated coolant medium is transferred to the environment external to the housing through condensation of the vapor at the external end of the container. The sealed container may be stationary or rotatable with the rotor shaft. A plurality of heat transfer containers may be provided.

19 Claims, 6 Drawing Sheets

DYNAMOELECTRIC MACHINE WITH EMBEDDED HEAT EXCHANGER

FIELD OF THE INVENTION

The present invention relates to a cooling system for a dynamoelectric machine and, more particularly, to a machine having an enclosed structure with an embedded heat exchanger.

BACKGROUND ART

Vertical solid shaft pumps are primarily used for industrial and utility water and sewage deep well applications. Typically, vertical solid shaft pump motors are either of the open drip-proof fan-cooled configuration or canned submersible solid shaft motor drives. Open drip-proof motors are suited for dry pit locations only and do not meet the requirements for submersible and explosion proof applications.

Submersible motors, which are cooled to some degree solely by exposure to the submersible environment, tend to overheat when operated continuously in open air. If the submersible environment is not sufficient to adequately cool the submersible motor, or if the motor is to be used in open air, additional cooling means are typically provided. A conventional liquid cooling system is illustrated in FIG. 1. The motor 10 is encased in a liquid cooling jacket 12 having an inlet port 14 and an outlet port 16. This system is an open loop system from the perspective of the motor, in that it requires external provisions, such as a pump or other prime mover, for maintaining flow of the liquid coolant.

Solid shaft pump motors present particular challenges in order to accommodate motor cooling requirements that vary with their specific usage. A need exists for a solid shaft pump motor having a self-contained cooling system that is operable in a variety of environments, including dry pit, dry pit submersible and explosion proof conditions. Such a pump motor should meet minimum regulatory requirements, such as U/L, Factory Mutual, CE and CSA requirements, without the need for external cooling, and be capable of handling high reverse load that occurs during backflow.

DISCLOSURE OF THE INVENTION

The present invention fulfills the above described needs, at least in part, by provision of a submersible embedded-cooling solid shaft pump motor construction. A dynamoelectric machine, having a stator and rotor, is enclosed in a sealed housing. Air can be circulated through the housing and machine components for contact with a sealed container of a coolant medium. The coolant medium may comprise, for example, water. The sealed container provides heat transfer from the circulated air through evaporation of the coolant medium. The sealed container may be a cylindrical hollow pipe having one closed end within the housing and another closed end external to the housing. Heat from the evaporated coolant medium can be transferred to the environment external to the housing through condensation of the vapor at the external end of the container. While this arrangement is suitable for submersible pump motor applications, the machine cooling system is beneficial in a variety of motor and generator applications.

Preferably, the sealed housing comprises a central portion in which the machine stator is mounted to the housing and the rotor is mounted to a shaft journaled to the housing for rotation about a longitudinal axis. A cavity in the housing longitudinally adjacent to each end of the central portion provides a sizable volume for air flow circulation, created by an impeller mounted on the shaft at one end portion cavity. The coolant medium container may be mounted to a partition dividing the central portion from the opposite end portion and extend through an end cap of the housing. Heat transfer is facilitated by provision of one or more cooling fins at the external end of the container. A plurality of such coolant medium containers can be situated in the end portion cavity to increase heat transfer capacity.

As a further aspect of the invention, an additional sealed cooling pipe configured as an annular ring may be provided that surrounds the shaft and is in fixed contact with the shaft for rotation therewith. The pipe, which contains a coolant medium, preferably extends through the opposite housing end cap with a closed end located external to the housing. An impeller of a pump driven by the motor may be mounted on the external end of the cooling pipe as an additional means for transferring heat from the pipe to the external environment. Internal screw threads may be provided within the heat pipe to aid the flow of coolant medium in the vertical direction. With the addition of the screw threads and external heat transfer provision, the annular ring cooling pipe may, in itself, provide sufficient motor cooling.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawing and in which like reference numerals refer to similar elements and in which.

DETAILED DESCRIPTION OF THE INVENTION

Figure 1:
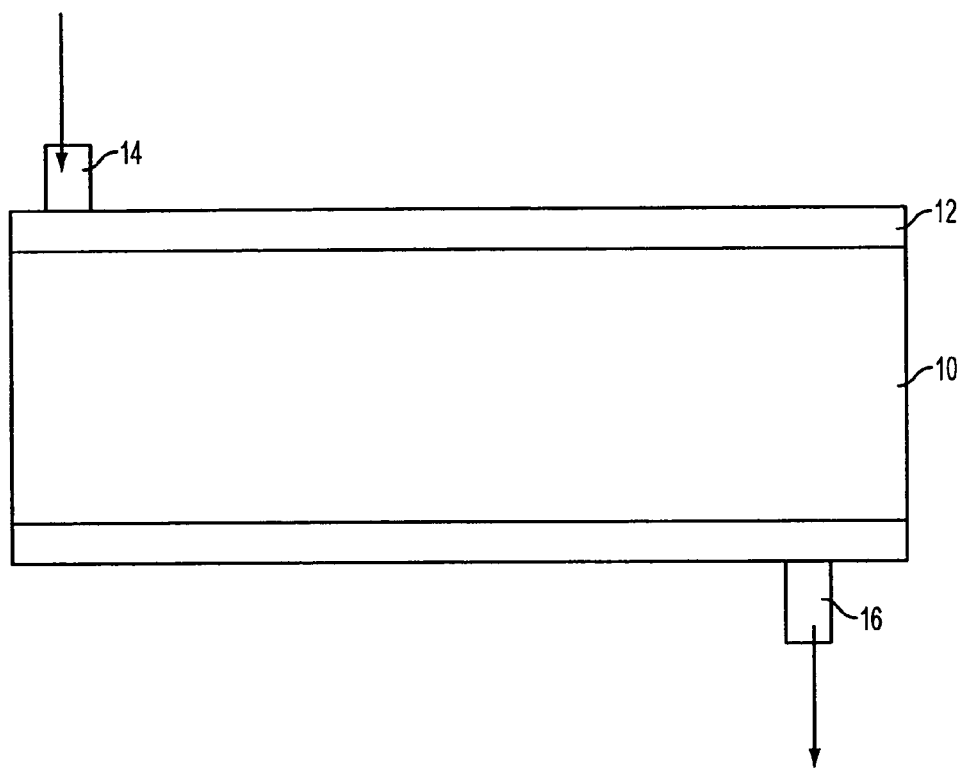
FIG. 1 is a view of a motor liquid cooling system of the prior art.
Figure 2:
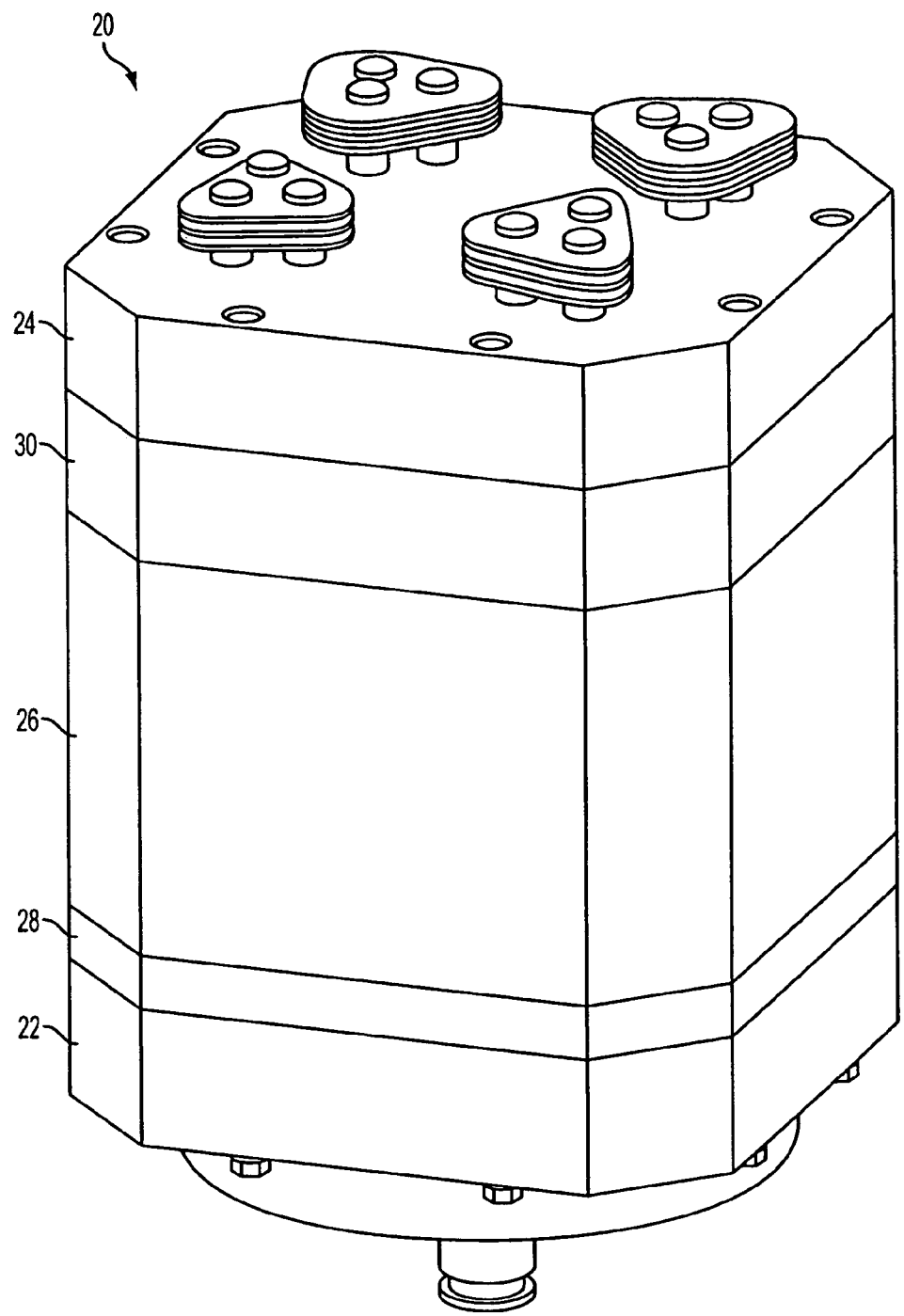
FIG. 2 is a perspective view of a sealed motor having an embedded self-contained cooling system in accordance with the present invention.
Figure 3:
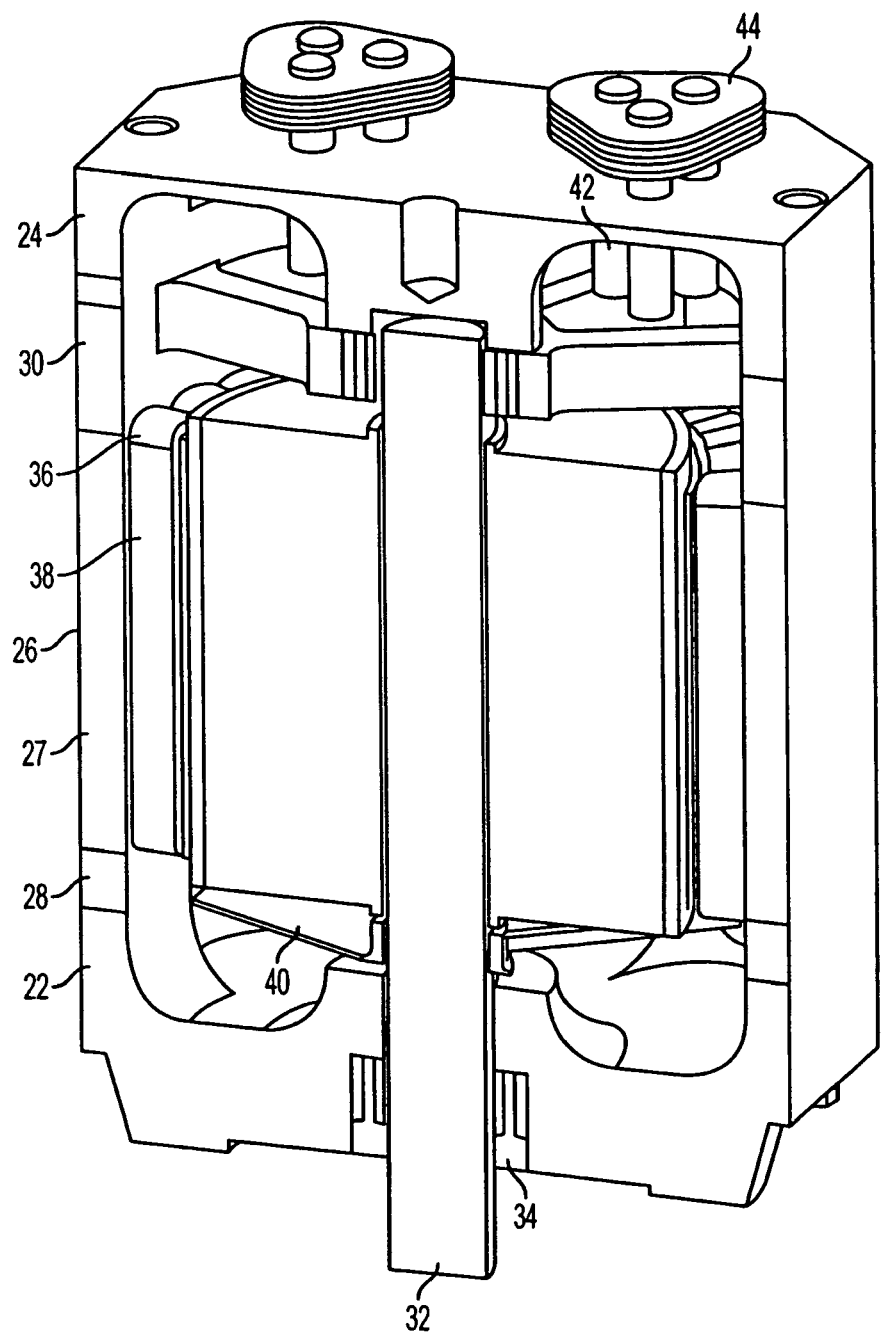
FIG. 3 is a partial perspective view of the system of FIG. 2.
Figure 4:
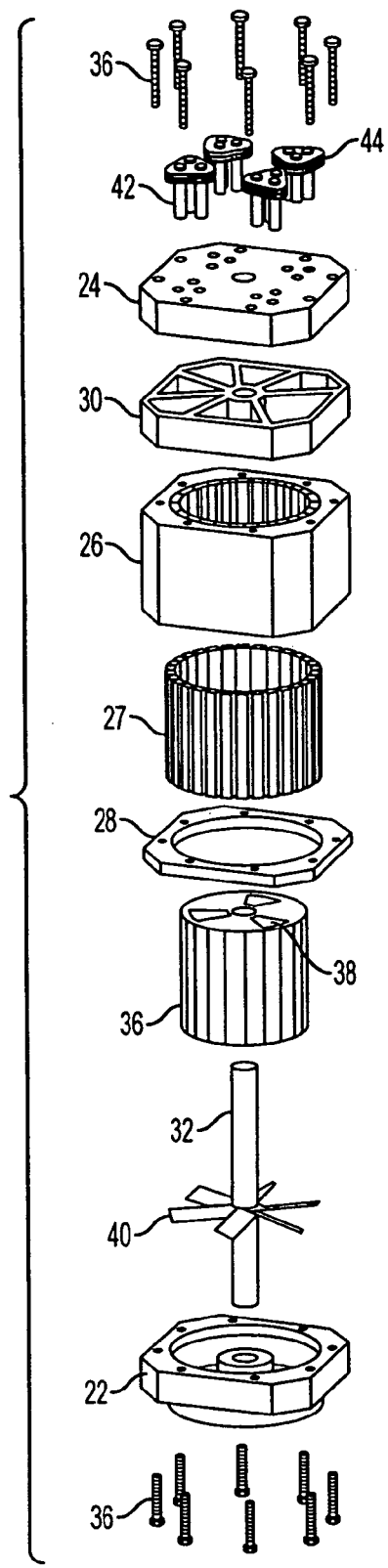
FIG. 4 is an exploded view of elements within system of FIG. 2.

With reference to FIG. 2, a sealed housing 20 comprises three longitudinal portions that terminate in end caps 22 and 24. As can be seen more clearly in the partial view of FIG. 3 and the exploded view of FIG. 4, a centrally located stator core housing 26 is affixed to end caps 22 and 24 via respective partitions 28 and 30. The partitions divide the central portion, which houses the machine elements, from end portions defined by the end caps. Each end cap is of one-piece construction of cast iron, forged steel or other material that meets explosion proof requirements. Holes for through bolts 36 are provided in the end caps, partitions and central housing section, with minimum edge distance to meet explosion proof requirements. With the end caps bolted to the central section via the partitions, explosion proof and submersion proof joints are formed. Shaft 32, which may be formed of one-piece stainless steel, is mounted for rotation through bearings 34 and seals, not shown, at end cap 22 and partition 30. 0-rings, labyrinth connections and tight fitting tolerances may be used individually or in combination to provide adequate sealing to prevent fluid transfer due to pressure changes within the motor. The motor in use is intended to be vertically oriented with end cap 24 upwards of end cap 22.

Stator core 26 is slotted to accommodate stator windings 27. The machine rotor comprises a plurality of permanent magnets 36 mounted to the outer periphery of cylindrical supporting structure 38. Ribs of the supporting structure, at radially spaced intervals, are joined to the outer periphery and to an inner annular ring. The inner periphery of the annular ring is affixed to shaft 32. The supporting structure 38 may be formed, for example, of solid low carbon steel or a stack of low carbon steel lamination sheets, to provide a back iron magnetic flux path between adjacent permanent magnets. The permanent magnets, which are successively of alternating magnetic polarity, provide a high amplitude alternating magnetic field when rotating relative to the stator.

The internal portions of end caps 22 and 24 form transitioning flow channels for an internal forced air cooling system and are shaped to smooth the flow of internal air. Impeller 40, mounted on shaft 32 within the end portion defined by end cap 22, creates air flow during machine operation. Air circulates between end portions through openings in the rotor support structure, through the radial air gap between the rotor and stator elements, and through passages in the slotted stator core. Closed heat transfer pipes 42 extend in longitudinal direction from partition 30 through end cap 24 to the external environment. The tubes contain a fluid coolant medium such as water. External cooling fins 44 are mounted to the ends of the heat transfer pipes that are external to the housing.

During machine operation, heat is removed from the motor by the forced air flow. The heat transfer pipes are heated convectively by the air that has been forced through the motor. The working fluid in the pipes absorbs the heat, evaporates to a gas and rises up the heat transfer pipes toward end cap 24 and external fins 44. Heat is transferred from the gas in the heat transfer pipes to end cap 24 and fins 44, which are convectively cooled by outside air. The cooling causes the gas to condense back to liquid that then flows downwardly in the heat transfer pipes toward partition 30 to continue the heat transfer cycle.

The minimum mass flow rate of the working fluid is determined by the latent heat of vaporization of the fluid. Capillary action is based on the surface tension of the fluid and the wicking material structure. Cooling system materials may be copper or aluminum and structurally configured so that fluid undergoes phase change from liquid to gas at specific temperatures, based on the operating temperature range of the motor. With the heat transfer pipes provided in the present invention, the heat generated by a machine, such as a pump motor, is quickly dissipated. The pump thus can be operated over long duration with a relatively uniform internal temperature distribution without the need for external cooling systems. As a further consequence, the external size of the motor can be reduced for a given power rating.

Figure 5:
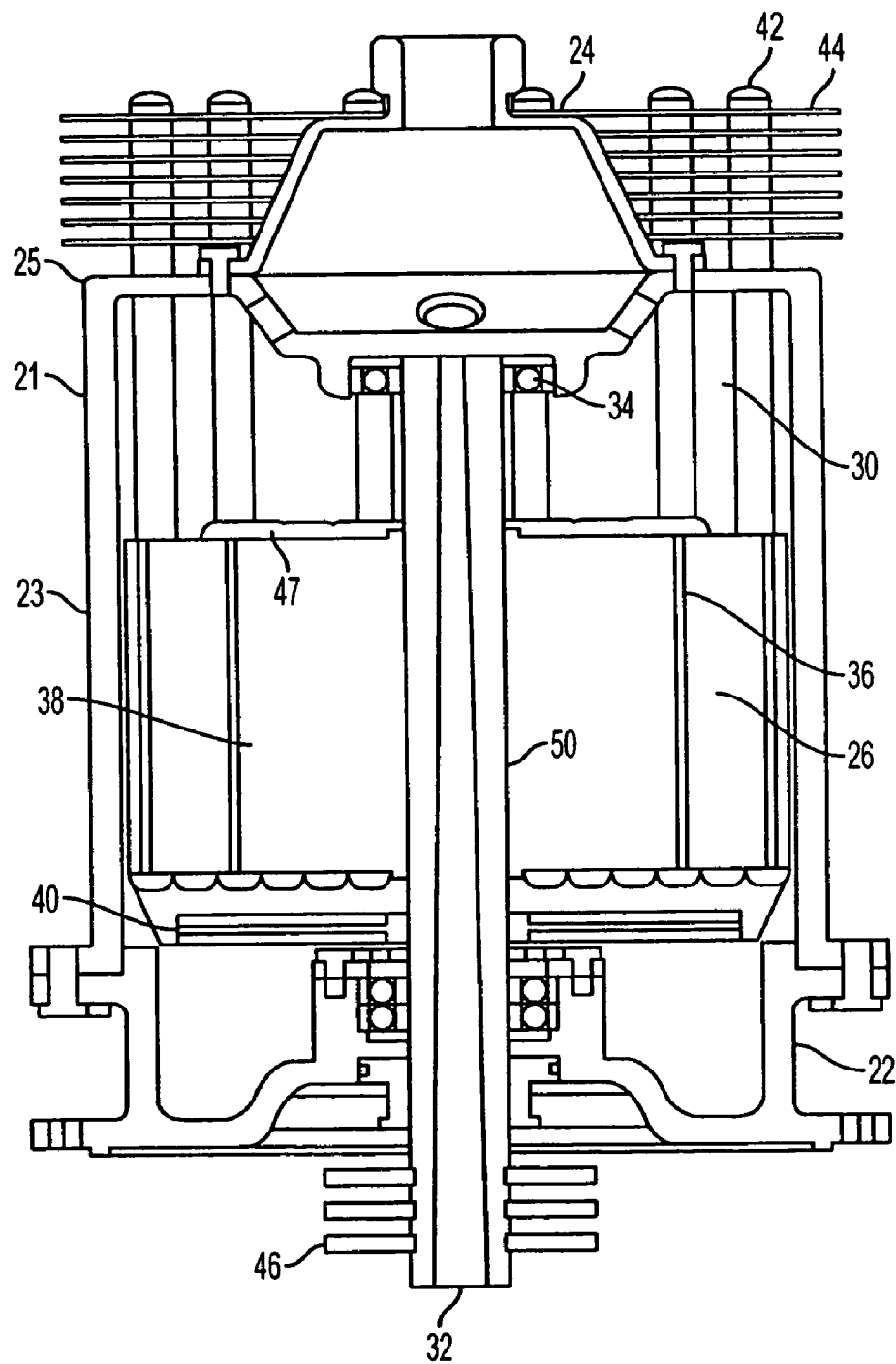
FIG. 5 is a cross-sectional view of a sealed motor with embedded self-contained cooling system in accordance with a second embodiment of the invention.

FIG. 5 is a cross-sectional view of a modified embodiment of the above-described motor cooling system. Central core 26, upon which stator windings 27 are formed, is contained within an outer housing 21. The outer housing 21 is configured with a cylindrical longitudinal side surface 23 that culminates in top surface 25. Housing 21 is joined at its bottom to end cap 22 and at its top to end cap 24. Partitions 30, secured to the end cap 24, define an upper cooling area that contains closed heat transfer pipes 42. The heat transfer pipes extend through surface 25 of outer housing surface 21. Cooling fins 44 are mounted on the external portions of the heat transfer pipes. End cap 24 defines an area for placement of wiring and control devices for the machine.

Figure 6:
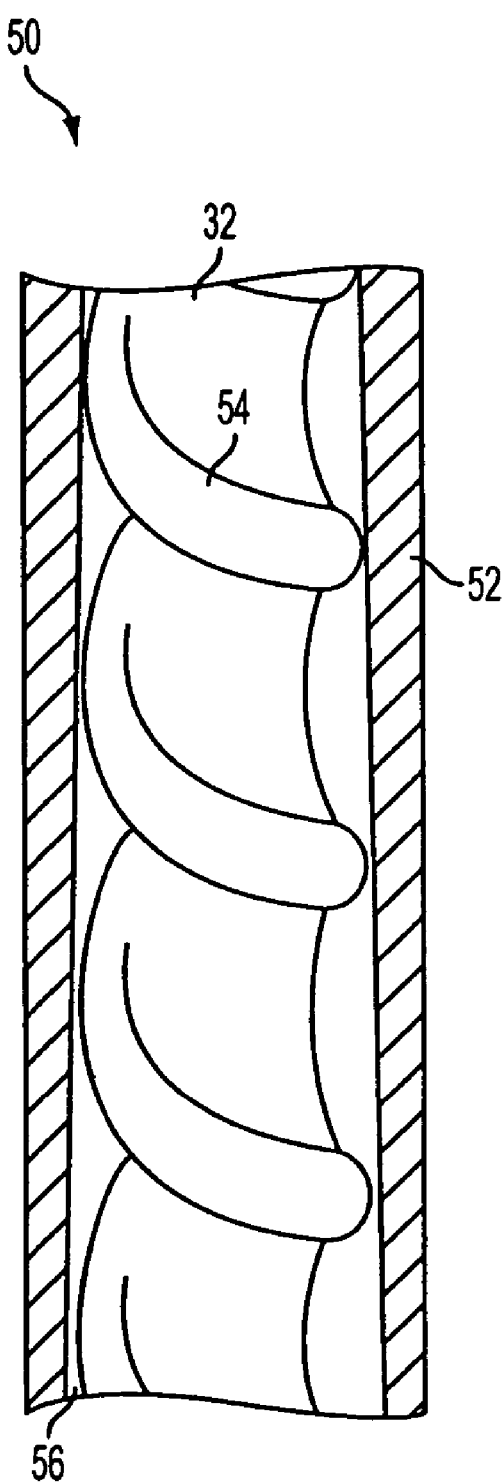
FIG. 6 is an enlarged partial cross-sectional view of the shaft and rotational heat pipe of the invention shown in FIG. 5.

Affixed to motor shaft 32 for rotation therewith is a sealed pipe 50, which is depicted in greater detail in FIG. 6. Rotor supporting structure 38 is directly mounted to the sealed pipe 50. Shaft 32 is coupled to stationary partition 30 and end cap 22 via the sealed pipe 50 and bearings 34. Impeller 40 is mounted on the pipe 50 for rotation therewith to provide air circulation through the internal structure of the machine. Shaft 32 and pipe 50 are attached to impeller blades 46 of an external pump which is to be driven by the motor. As shown in FIG. 6, pipe 50 comprises an annular portion 52, shown in cross section, and an integrated helical threaded screw portion 54. The screw threads join the annular portion 52 to the shaft 32 to form a separation channel 56 therebetween in which a coolant, such as water, is maintained.

Pump impeller 46 provides an external heat sink for motor cooling. Rotary motion is used to return condensate, formed in the pipe during external heat transfer to the impeller, to the hot evaporator side within the motor. The screw threads 54 work against gravity to provide upward fluid flow without need of wicking. A slight taper in the direction of the condenser, as shown in FIG. 5 provides an axial component of the centrifugal force that aids the condensate to return to the evaporator. As the shaft rotates, the condensate material is pushed back into the evaporator side by upward thrust force. Tapering increases the heat transfer coefficient in comparison with a non-tapered rotating heat pipe as production of a condensate film in the pipe is minimized. Provision of a screw insert in the pipe increases the performance of the rotating heat pipe, in comparison with a heat pipe lacking the screw, at low speeds. The centrifugal force of the rotating heat pipe depends upon the rotational speed of the shaft. When the speed is low, centrifugal force alone is insufficient to return the condensate to the evaporator side, absent the internal screw. With the provision of the integrated screw portion, a continuous heat transfer loop is thus maintained without the use of valves, pumps or compressors.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, the stator core 26 may be fabricated of soft magnetic composites assembled into a steel shell that provides improved environmental sealing for special cases when high pressure sealing of the motor in required. The external surface of the upper end cap may have a series of fins to increase convective heat transfer to the outside air.

The illustrated arrangement of four sets of three heat transfer pipes, each set coupled to respective external cooling fins, is merely exemplary. The number of heat transfer pipes and external fins and their relative configurations can be changed as appropriate to comply with physical dimensions of the machine and expected loads. In addition, although an embodiment is exemplified that incorporates both stationary and rotating heat transfer pipes, provision of a rotating heat transfer pipe with integrated helical screw without additional stationary cooling pipes may be sufficient for particular machine applications.

Rotor structure can be modified to further enhance the forced air circulation, such as providing holes or spaces in the back iron. Spacers may be placed between the rotor magnets to control the pulsation of air as the rotor spins, thereby increasing the heat transfer rate from the rotor to the air contained within the motor and also to minimize the air drag resistance acting on the rotor. The magnets may also be contoured to produce specific cogging and active torque profiles.

The present invention is not limited to pump applications and may be used in other applications such as turbines, down hole well, flood control, agriculture and irrigation, mine slurry, aeration and mixing, below deck ships and dry pit environments. All materials can be selected for their ability to withstand extreme environmental conditions while immersed in salt water, oil and untreated sewage water.

What is claimed is:

1. A method for cooling a motor during operation wherein said motor comprises a stator and rotor separated by an air gap and located within a sealed housing, a shaft mechanically coupled to said rotor and extending from said rotor through said housing wherein a sealed pipe with two closed ends is secured to the external perimeter of said shaft having at least some coolant medium contained inside said sealed pipe, wherein one closed end of the sealed pipe extends through the perimeter of said housing, said method comprising:

rotating the rotor inside said housing so that air inside said housing increases in temperature:

transferring heat from said heated air to said sealed pipe and evaporating the coolant medium within the sealed pipe; and transferring and condensing the evaporated coolant medium at a position external to the housing.

2. A method as recited in claim 1, wherein said coolant medium is water.

3. A method as recited in claim 1, wherein said sealed pipe shape is a cylindrical annular ring.

4. A method as recited in claim 1, wherein said motor is submersible in liquid.

5. A motor comprising:
a stator;
a rotor, wherein said rotor and stator are separated by an air gap;
a sealed housing enclosing the stator and rotor, wherein the stator is secured to the housing;
a shaft secured to said rotor and journaled from the housing for rotation and at least some portion of said shaft extending through said housing; and
a sealed pipe with two closed ends secured to the external perimeter of said shaft having at least some coolant medium contained inside said sealed pipe, wherein one closed end of the sealed pipe extends through the perimeter of said housing.

6. A motor as recited in claim 5, wherein said coolant medium comprises water.

7. A motor as recited in claim 5, wherein the housing further comprises:

a first partition separating the first end portion air cavity from the central portion;

a first end cap enclosing the first end portion;

a second partition separating the second end portion air cavity from the central portion;

a second end cap enclosing the second end portion; and wherein the sealed pipe is extends outside the housing through the second end cap.

8. A motor as recited in claim 5, wherein said motor is submersible in liquids.

9. A motor as recited in claim 5, wherein said shaft and said sealed pipe are each thermally coupled to respective heat exchange surfaces external to the housing.

10. A motor as recited in claim 5, wherein said sealed pipe is configured in a cylindrical annular ring.

11. A motor as recited in claim 5, wherein said sealed pipe is secured to an impeller external to the housing.

12. A motor as recited in claim 5, wherein said sealed pipe is tapered along the longitudinal direction of said shaft.

13. A motor as recited in claim 5, wherein said sealed pipe comprises helical threads for transporting said coolant medium within said sealed pipe.

14. A motor as recited in claim 5, wherein an air cavity separates said stator and rotor from the inner surface of the housing in the longitudinal direction of said shaft.

15. A motor as recited in claim 5, further comprising at least one or more second sealed pipe with a first and a second closed end having at least some coolant medium contained inside said second sealed pipe, wherein a first closed end of said second pipe is located within said housing and the second closed end of the sealed pipe is located external to the housing at an opposite end of said shaft.

16. A motor as recited in claim 15, wherein said second sealed pipe is thermally coupled with a heat transfer fin located external to the housing.

17. A motor as recited in claim 15, wherein said second sealed pipe is stationary.

18. A motor as recited in claim 15, wherein said second closed end of said second sealed pipe is thermally coupled to a heat exchange surface.

19. A motor as recited in claim 15, wherein said coolant medium comprises water.

* * * * *